United States Patent
Vella

(10) Patent No.: US 7,668,887 B2
(45) Date of Patent: Feb. 23, 2010

(54) METHOD, SYSTEM AND SOFTWARE PRODUCT FOR LOCATING DOCUMENTS OF INTEREST

(75) Inventor: Matthew Vella, Officer (AU)

(73) Assignee: Object Positive Pty Ltd, Victoria (AU)

( * ) Notice: Subject to any disclaimer, the term of this patent is extended or adjusted under 35 U.S.C. 154(b) by 339 days.

(21) Appl. No.: 11/606,018

(22) Filed: Nov. 30, 2006

(65) Prior Publication Data

US 2007/0136276 A1 Jun. 14, 2007

(30) Foreign Application Priority Data

Dec. 1, 2005 (AU) .............................. 2005906752

(51) Int. Cl.
*G06F 17/30* (2006.01)
(52) U.S. Cl. ...................... 707/706; 707/722; 707/723; 707/748; 715/223; 715/229
(58) Field of Classification Search ................. 707/1–7, 707/100–104.17; 715/223–229
See application file for complete search history.

(56) References Cited

U.S. PATENT DOCUMENTS

| | | | |
|---|---|---|---|
| 5,619,709 A * | 4/1997 | Caid et al. ................... | 715/209 |
| 6,314,420 B1 | 11/2001 | Lang et al. | |
| 6,327,590 B1 | 12/2001 | Chidlovskii et al. | |
| 6,353,825 B1 | 3/2002 | Ponte | |
| 6,480,843 B2 * | 11/2002 | Li ................................. | 707/5 |
| 6,523,026 B1 * | 2/2003 | Gillis ............................. | 707/3 |
| 6,622,122 B1 * | 9/2003 | Fukushige et al. ........... | 704/257 |
| 6,675,159 B1 * | 1/2004 | Lin et al. ....................... | 707/3 |
| 6,775,664 B2 | 8/2004 | Lang et al. | |
| 6,801,906 B1 | 10/2004 | Bates et al. | |
| 6,947,930 B2 * | 9/2005 | Anick et al. ................... | 707/5 |
| 7,085,778 B2 | 8/2006 | Reed et al. | |
| 7,092,936 B1 | 8/2006 | Alonso et al. | |
| 7,490,092 B2 * | 2/2009 | Sibley et al. ................. | 707/100 |
| 2002/0156760 A1 * | 10/2002 | Lawrence et al. .............. | 707/1 |
| 2003/0020749 A1 * | 1/2003 | Abu-Hakima et al. ........ | 345/752 |
| 2005/0154690 A1 * | 7/2005 | Nitta et al. ..................... | 706/46 |
| 2005/0203924 A1 * | 9/2005 | Rosenberg ................... | 707/100 |
| 2005/0216443 A1 * | 9/2005 | Morton et al. .................. | 707/3 |
| 2006/0031197 A1 * | 2/2006 | Oral et al. ....................... | 707/3 |
| 2006/0047635 A1 * | 3/2006 | Kraenzel et al. ............... | 707/3 |
| 2006/0053154 A1 * | 3/2006 | Yano ........................... | 707/102 |
| 2006/0064431 A1 * | 3/2006 | Kishore et al. .............. | 707/102 |
| 2006/0167872 A1 * | 7/2006 | Parikh ............................ | 707/6 |

* cited by examiner

*Primary Examiner*—Wilson Lee
*Assistant Examiner*—Hanh B Thai
(74) *Attorney, Agent, or Firm*—Finnegan, Henderson, Farabow, Garrett & Dunner, L.L.P.

(57) ABSTRACT

A computer-implemented method of maintaining a list of documents of interest to a user within a corpus of documents includes associating an editable user document with the corpus and generating an initial list of documents based upon an initial content of the user document. The list is generated by cross-referencing the initial content with content of documents in the corpus, and each entry in the initial list is assigned a corresponding initial ranking value based upon the cross-referencing. The user is presented with an initial list of documents of interest from within the corpus on the basis of the initial ranking values. Responsive to one or more updates of the editable document by the user, one or more further lists of documents are generated based upon updated content of the document. The process may be repeated to provide the user with ongoing feedback of relevant documents within the corpus.

25 Claims, 5 Drawing Sheets

METHOD, SYSTEM AND SOFTWARE PRODUCT FOR LOCATING DOCUMENTS OF INTEREST

FIELD OF THE INVENTION

The present invention relates generally to online document searching and, more particularly, to methods, systems and computer software products for providing improved identification of documents of interest based upon evolving user input in relation to a corresponding topic.

BACKGROUND OF THE INVENTION

Contemporary information systems and networks, including large localised and distributed databases, the Internet generally, and the World Wide Web ("web") in particular, contain huge quantities of information. However, locating documents containing information of particular interest remains a challenging problem. In response to this need, various strategies for locating and ranking documents of interest, generally in response to specific search queries provided by users, have been developed. An important application of such methods is that of searching for documents on the web, and a number of web search engines, including Google, Yahoo, AltaVista, Lycos and so forth, are well known to Internet users around the world.

The function of web search engines is to identify and rank documents, or more specifically web pages, of interest to a user. The search process typically begins with the user providing a search query, which is typically a list of search terms. The search engine then attempts to identify documents of particular interest to the user based upon the search query. The most common method by which this is achieved involves matching the various terms included in the search query with the contents of a corpus of pre-stored or otherwise suitably indexed web pages and/or other documents. Documents that include the terms appearing in the search query are generally known as "hits". Most search engines make some attempt to rank the hits in order of relevance before returning a corresponding list of documents to the user.

A number of methods for ranking hits are known in the art. The simplest approach is to rank hits according to the number of terms in the search query appearing within each identified document. Accordingly, a document that contains all of a user's search terms is considered to be more relevant than a document including only some of the search terms. The main problem inherent in this simple approach is that it is wholly dependent upon the quality of the search terms selected by the user. Many common words are insufficiently specific to enable relevant documents to be distinguished from largely irrelevant documents, and the onus lies with the user to select specific search terms having a particular likelihood of appearing only in relevant documents. Experience suggests that this is an unreasonable expectation to place upon users, and particularly those users who are relatively inexperienced in the use of keyword-based search engines.

Various strategies have been employed to improve the quality of search results returned in response to simple keyword search queries. For example, it is known to be generally beneficial for the search engine to ignore words that are known to be particularly common, and to be of little significance in assessing the relevance of documents to a particular search query. Obvious examples of words having little or no significance in relation to the relevance of a document include (in English) "a", "the", "and", "or" and so forth. This strategy goes some way towards enabling users to enter plain language queries, however it cannot provide a guarantee that there is a high correlation between the less common words that are not ignored and the relevance of the documents returned to the user's actual search requirement.

Additional methods have therefore been proposed and/or implemented for improving the relevance of search results based upon information that is extrinsic to the user's search query. For example, hits may be ranked according to factors including the apparent popularity or relevance of the documents to other users who have performed similar searches in the past, the degree of interest of the documents inferred from the extent to which other documents refer or link to them, and/or other feedback received from previous users of the search engine. The inherent disadvantage of all of these types of approach is that the main criteria in assigning a high ranking to a particular document is its general level of "popularity", and not its particular relevance to a specific user's search query.

While statistically there may be a general correlation between popularity and relevance, this is generally only the fortuitous result of the fact that, over time, a large population of users of a search engine will frequently tend to search for similar information. This should not be mistaken for a genuine and intrinsic ability of the search engine to provide appropriately ranked and highly relevant results in response to any single specific search query.

A further limitation of search engines based upon conventional keyword search queries is that a query including a larger number of search terms is, in general, likely to produce a smaller number of highly relevant documents. This apparently counter-intuitive result arises because, unless the search terms are particularly well-chosen by the user, the chances of all of them occurring, even in a highly relevant document, may be relatively small. This is unfortunate, because it would be highly desirable, particularly for inexperienced users of search engines, to be able to enter a relatively lengthy description of the information of interest to the user, for example in a natural language form, thereby relieving the user of the responsibility for preselecting the most appropriate search terms.

Additionally, when a user is initially researching a particular topic of interest, they may not even be aware initially of the terms that are of greatest relevance to the topic of interest. However, as the user's research proceeds and they begin to acquire additional knowledge of the topic, they may begin to identify additional key terms that could be used to improve the relevance of the search results. Unfortunately, inexperienced and/or untrained researchers often do not appreciate this fact, and therefore do not recognise the value of applying their improving knowledge of the topic to update their original search query. Furthermore, conventional search engines do not provide any encouragement or support for this kind of continuing improvement of search queries.

It will be appreciated that a number of the foregoing limitations of known search engines are, to some extent, a consequence of the fact that the basic interface for providing input to such search engines has remained substantially unchanged for many years. In particular, the conventional search engine interface enables the user to enter a limited search query consisting primarily of a small number of user-selected keywords. While the search query may be retained during a single session, or may be saved for subsequent retrieval (either on the search server system or, more typically, on the user's computer), this basic interface does not enable the search query to evolve in any meaningful way as the user's understanding of the topic improves. Equally significantly, while the user may be maintaining notes, comments, printouts and other records of their research as they proceed, the search engine is unable to take advantage of any of this information in order to improve the quality of search results.

One previous attempt to mitigate some of these limitations is disclosed in U.S. Pat. No. 6,353,825 (5 Mar. 2002), issued to Jay Michael Ponte ("Ponte"). Ponte describes a system and method in which a user is enabled to select one or more documents identified in an initial search based on a conventional search query, wherein the selected documents are those considered by the user to be of particular relevance to a topic of interest. In accordance with Ponte, the selected documents are analysed to identify distinguishing terms appearing therein, that are assumed to be relevant to the search topic, and the words thus extracted are used as the basis for an improved search. However, this approach remains unsatisfactory in a number of respects. For example, it is based solely upon the content of documents selected by the user, who is thus still potentially required to review multiple irrelevant documents in order to identify one or more documents of possible relevance. Additionally, the user can only review and select those documents that are identified in the initial search, and the effectiveness of Ponte thus remains strongly dependent upon the quality of the user's own initial search query which, as noted above, may be problematic. Further, the Ponte system and method is unable to distinguish between portions of a document that are relevant to the user's interest and those that are not. Accordingly, Ponte remains unable to utilize the user's own notes and comments on a topic, as these evolve in the course of ongoing research.

Accordingly, it is an object of the present invention to provide improved methods, systems and software products for conducting searches of large numbers of web pages or other documents, which mitigate the various abovementioned limitations of conventional search engines.

SUMMARY OF THE INVENTION

In one aspect, the present invention provides a computer-implemented method of maintaining a list of documents of interest to a user within a corpus of documents, the method comprising the steps of:

associating an editable user document with said corpus of documents;

generating an initial list of documents within the corpus based upon an initial content of the editable user document by cross-referencing said initial content with content of documents in the corpus, each entry in said initial list being assigned a corresponding initial ranking value based upon said cross-referencing;

presenting the user with an initial list of one or more documents of interest from within the corpus on the basis of said initial ranking values;

responsive to one or more updates of the editable document by the user, generating one or more further lists of documents within the corpus based upon updated content of the editable user document by cross-referencing said updated content with content of documents in the corpus, each entry in said further list being assigned a corresponding revised ranking value based upon said cross-referencing; and presenting the user with a revised list of one or more documents of interest from within the corpus on the basis of said revised ranking values.

Accordingly, the method of the invention is not limited to identifying documents of interest based solely upon a traditional search query. Rather, the invention is able to utilise a range of information considered relevant by the user, as represented by the content of the user's own document. Each search conducted according to the inventive method is thus focused on the content of the user's document, which the user may update in the new information and ideas derived from the documents identified in earlier searches, and therefore need not be excessively reliant upon information extrinsic to the user's particular interests in order to rank documents. The inventive method is thereby able to mitigate problems of the prior art associated with applying statistical and/or historical information that may bear no relationship to the user's specific requirements. Furthermore, the invention does not rely merely upon the content of documents identified in a search to improve results, but rather is able to make use of the user's notes, comments and other input developed in the course of ongoing research, including input derived by the user's own reading of such documents in the specific context of the topic of interest.

Advantageously, by cross-referencing the content of an editable user document with the contents of documents within the corpus, rather than merely identifying hits based upon individual terms within a search query, it is possible to obtain improved search results based upon lengthy and/or descriptive user content, thereby mitigating the problems associated with more simple keyword search approaches.

In various embodiments of the invention, the editable user document may take a variety of different forms. For example, in one particularly preferred embodiment a web-based search system provides an interface including web-hosted document presented as a text field in which the user is able to enter notes, comments or other relevant information derived from identified documents of interest. The contents of this web-hosted document may then be utilised as the editable user document within the inventive method. As will be appreciated, the editable user document in a web-based system of this type may equally consist of an alternative form of web-hosted document, or other type of user-definable field or form element on a web page or the like. Furthermore, in alternative embodiments the editable user document may be some other type of document, such as a plain text document, a word-processing document, an email message, and so forth. In still other embodiments, particularly those providing for interaction and.or collaboration amongst multiple users, the editable user document may include instant messaging or other interactive chat messages, collaborative documents, Short Message Service (SMS) messages, and the like. As will be appreciated, in such embodiments the inventive method may be utilised to provide the user with a periodically updated list of documents relevant to the content being entered within the document. Advantageously, the invention thereby enables one or more users to be presented with regularly updated research information relevant to the subject matter of a document, such as a word-processing document, email message, or other type of document or message that the user or users is/are composing.

In preferred embodiments the initial and further lists are populated with references to those documents having greatest relevance to the content of the user document based upon the respective initial and revised ranking values.

For example, computing a ranking value of a document within the corpus may include accumulating co-occurrence values corresponding with common occurrences of stemmed words within the editable user document and within the corpus document. In this context, it will be understood that the term "stemmed words" refers to words having a common stem, such that, for example, the words "write", "writes", "writing", and "writings" are considered to be equivalent. It will be appreciated, however, that other ranking methods may be employed within the scope of the invention, including methods available in the prior art, as well as new and/or improved ranking methods such as may be developed in the future. For example, in accordance with one envisaged enhancement, co-occurrence values may be accumulated based not only upon exact matches between stemmed words within the editable user document, but also upon the occurrence of synonyms. Identification of synonyms may be achieved, for example, by the use of a searchable thesaurus, and occurrences of synonyms may be accorded equal, greater, or lesser weight than exact matches, as appropriate.

Preferably, each co-occurrence value is weighted in accordance with a frequency of occurrence of the corresponding stemmed word within the corpus, such that, for example, a higher co-occurrence value is associated with words occurring with lower frequency within the corpus. Advantageously, this approach accords greater significance to less common terms within the user document, while affording relatively little significance to common words such as "and", "the", "a" and so forth. Indeed, in preferred embodiments of the invention all words appearing in all documents within the corpus are assigned a specific weighting based upon their frequency of occurrence, thereby avoiding the making of artificial distinctions between predetermined "common" and "uncommon" words.

In particular, in one especially preferred embodiment the weighting is based upon a probability of occurrence of the corresponding stemmed word within the corpus, defined as the number of corpus documents containing at least one occurrence of the stemmed word divided by the total number of documents in the corpus. A suitable weighting value may be derived from the inverse of the probability of occurrence of the corresponding stemmed word.

In a particularly preferred embodiment, an information theoretic approach is adopted for assigning weighting values for words appearing within the corpus of documents. Specifically, according to this preferred approach, the inverse of the probability of occurrence of each stemmed word is used as the basis for defining a corresponding number of bits of information associated with the word. For example, very uncommon words may generally be assumed to be highly specific in meaning and application, and therefore to represent a relatively large number of bits of information. Conversely, very common words have very little information value, and are generally of little significance in determining the relevance of particular documents.

More specifically, according to the preferred implementation a weighting value w may be associated with a stemmed word having a probability of occurrence p according to the following formula:

$$w = \log_2(p^{-1})$$

In some embodiments of the invention, the step of generating further lists of documents within the corpus responsive to updates of the editable user document may be initiated by the user saving the editable document following the entry of one or more updates to the document. In alternative embodiments, the step of generating further lists of documents may be initiated automatically upon the entry by the user of one or more updates to the editable user document. Advantageously, in at least preferred embodiments, the invention thereby facilitates ongoing refinement of the information used for conducting searches without requiring the user to select and update specific terms within an initial search query.

In accordance with preferred embodiments, the method further includes the steps of receiving from the user a selection of documents from the initial and/or further lists of documents, and adding said selections to a list of user-selected documents. Advantageously, this enables the user easily to maintain a custom list of the most relevant documents identified in the course of performing online research, which is preferably accessible to the user for viewing and/or modification, either permanently or upon demand. Furthermore, it is particularly preferred that documents on the list of user-selected documents are excluded from subsequent further lists of documents generated from within the corpus, and/or from revised lists of documents presented to the user. In this way, the lists of relevant documents subsequently presented to the user advantageously do not include redundant references that the user has already added to their own list of user-selected documents.

In some embodiments all relevant information provided by the user, including the full contents of documents on the user-selected list, are utilized in the generation of one or more further lists of documents of interest. The cross-referencing method employed in preferred embodiments enables the very large number of effective terms in the resulting combined documents to be employed in order to identify documents of greater interest to the user.

The steps of generating further lists of documents and presenting the user with a revised list of documents of interest may thereafter be repeated one or more times in order to further refine the list of documents of relevance to the user. These steps may be initiated by explicit user action, such as the input of a user command or the user performing a save of the user document, or alternatively may be continuously or periodically initiated automatically, responsive to user updates of the user document. Advantageously, in at least preferred embodiments, the invention facilitates a research process in which the increasing amount of information related to the topic of interest to the user, as represented by updates to the editable user document, is continuously fed back in order to refine the list of documents of greatest interest to the user.

In another aspect, the invention provides a computer-implemented system for maintaining a list of documents of interest to a user within a corpus of documents, the system including one or more computers comprising:

at least one processor;

a database of the corpus of documents; and at least one storage medium operatively coupled to the processor, the storage medium containing program instructions for execution by the processor, said program instructions causing the processor to execute the steps of:

associating an editable user document with said corpus of documents;

generating an initial list of documents within the corpus based upon an initial content of the editable user document by cross-referencing said initial content with content of documents in the corpus, each entry in said initial list being assigned a corresponding initial ranking value based upon said cross-referencing;

presenting the user with an initial list of one or more documents of interest from within the corpus on the basis of said initial ranking values;

responsive to one or more updates of the editable document by the user, generating one or more further lists of documents within the corpus based upon updated content of the editable user document by cross-referencing said updated content with content of documents in the corpus, each entry in said further list being assigned a corresponding revised ranking value based upon said cross-referencing; and presenting the user with a revised list of one or more documents of interest from within the corpus on the basis of said revised ranking values.

In another aspect, the invention provides a computer-implemented system for maintaining a list of documents of interest to a user within a corpus of documents, the system including:

means for associating an editable user document with said corpus of documents;

means for generating an initial list of documents within the corpus based upon an initial content of the editable user document by cross-referencing said initial content with content of documents in the corpus, each entry in said initial list being assigned a corresponding initial ranking value based upon said cross-referencing;

means for presenting the user with an initial list of one or more documents of interest from within the corpus on the basis of said initial ranking values;

means, responsive to one or more updates of the editable user document, for generating one or more further lists of documents within the corpus based upon updated content of the editable user document by cross-referencing said updated content with content of documents in the corpus, each entry in said further list being assigned a corresponding revised ranking value based upon said cross-referencing; and means for presenting the user with a revised list of one or more documents of interest from within the corpus on the basis of said revised ranking values.

The system preferably includes a server connected to a network, the server being configured to receive contents and/or updates of the editable user document via the network, and having at least one processor. The server also preferably includes a database of the corpus of documents.

The means for receiving user document contents and/or updates, and for presenting the initial and revised lists of documents may include suitable interface hardware of the server for interfacing to the network, and may further include one or more software components executed by the at least one processor, the software components including instructions to effect the corresponding functionality.

The means for generating an initial list of documents and the means for generating at least one further list of documents may include one or more software components executed by the at least one processor for identifying one or more documents within the corpus that are of interest to the user.

In yet another aspect, the present invention provides a tangible computer-readable medium having computer-executable instructions stored thereon for performing a method of maintaining a list of documents of interest to a user within a corpus of documents, the method comprising the steps of:

associating an editable user document with said corpus of documents;

generating an initial list of documents within the corpus based upon an initial content of the editable user document by cross-referencing said initial content with content of documents in the corpus, each entry in said initial list being assigned a corresponding initial ranking value based upon said cross-referencing;

presenting the user with an initial list of one or more documents of interest from within the corpus on the basis of said initial ranking values;

responsive to one or more updates of the editable document by the user, generating one or more further lists of documents within the corpus based upon updated content of the editable user document by cross-referencing said updated content with content of documents in the corpus, each entry in said further list being assigned a corresponding revised ranking value based upon said cross-referencing; and presenting the user with a revised list of one or more documents of interest from within the corpus on the basis of said revised ranking values.

Further preferred features and advantages of the invention will be apparent to those skilled in the art from the following description of preferred embodiments of the invention, which should not be considered to be limiting of the scope of the invention as defined in the preceding statements, or in the claims appended hereto.

BRIEF DESCRIPTION OF THE DRAWINGS

Preferred embodiments of the invention are described with reference to the accompanying drawings, in which like reference numerals refer to like features and wherein.

DETAILED DESCRIPTION OF PREFERRED EMBODIMENTS

An online search tool in accordance with a preferred embodiment of the present invention maintains a list of documents of interest to a user utilizing the contents of an editable user document, including user updates thereof, in order to improve the relevance of results subsequently returned to the user. In particular, according to preferred methods, systems and products described herein, a cross-reference engine is employed to identify documents within a corpus of documents that are of interest to the user by cross-referencing the contents of the user document to facilitate continuing improvement in the relevance of results provided by the system.

Figure 1:
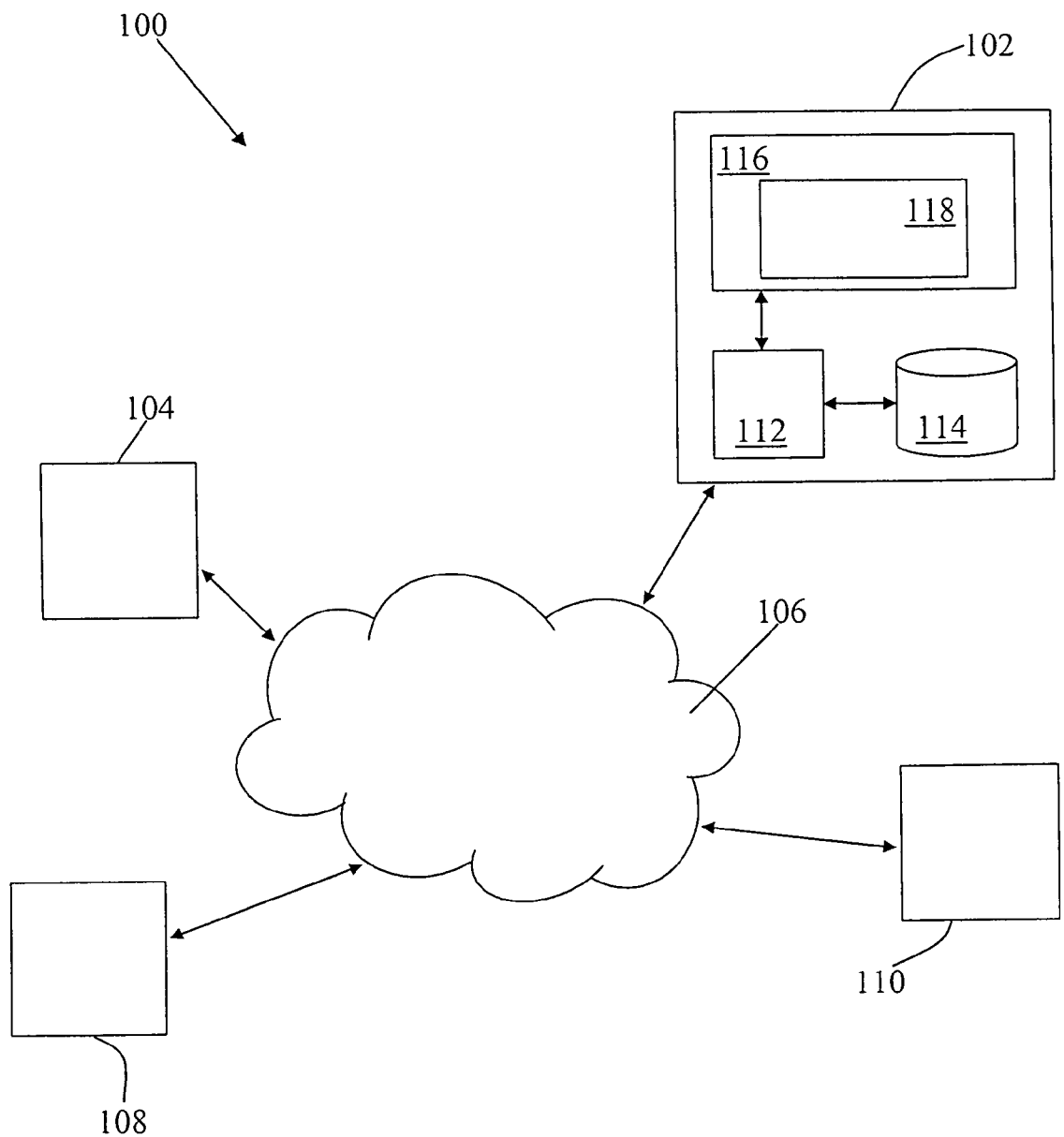
FIG. 1 illustrates an exemplary system in which preferred embodiments of the invention may be implemented.

FIG. 1 illustrates an exemplary system 100 in which preferred embodiments of the invention may be implemented. The system includes a server 102 and at least one user terminal 104, both of which are connected to a network 106, which may be, for example, the Internet. Also connected to the network 106 are a plurality of user terminals and/or servers, eg 108, 110. It will be appreciated that FIG. 1 depicts the system 100 schematically only, and is not intended to limit the technology employed in the servers, user terminals and/or communications links. The user terminals in particular may be wired or wireless devices, and their connections to the network may utilize various technologies and bandwidths. For example, applicable user terminals include (without limitation): PC's with wired (eg LAN, cable, ADLS, dial-up) or wireless (eg WLAN, cellular) connections; and wireless portable/handheld devices such as PDA's or mobile/cellular telephones. The protocols and interfaces between the user terminals and the servers may also vary according to available technologies, and include (again without limitation): wired TCP/IP (Internet) protocols; GPRS, WAP and/or 3G protocols (for handheld/cellular devices); Short Message Service (SMS) messaging for digital mobile/cellular devices; and/or proprietary communications protocols.

In the exemplary case in which the network 106 is the Internet, vast quantities of information are available to the user of terminal 104 from servers, and particularly web servers, located throughout the world. A particular problem thus faced by the user of terminal 104 is that of finding relevant information of interest within this vast distributed store of information.

To this end, the server 102 incorporates a search engine for providing a document location service to users, such as the user of terminal 104. The server 102 includes at least one processor 112 as well as a database 114, which would typically be stored on a secondary storage device of the server 102, such as one or more hard disk drives. According to preferred embodiments of the invention, the database 114 contains a corpus of documents, consisting of pre-stored, or otherwise suitably indexed, copies of web pages and/or other documents available from servers connected to the network 106. Population of the database 114 may be achieved using a variety of techniques well-known in the art, such as through the operation of so called "web crawlers".

Server 102 further includes at least one storage medium 116, typically being a suitable type of memory, such as random access memory, for containing program instructions and transient data related to the operation of the search engine as well as other necessary functions of the server 102. In particular, the memory 116 contains a body of program instructions 118 implementing the functions of a search engine in accordance with preferred embodiments of the invention. The body of program instructions 118 includes instructions for providing an interface to the search engine, such as a web-based interface and/or networked API, and a cross-reference engine, the operation of which will be described hereafter, for identifying documents of interest to the user within the corpus of documents stored in database 114.

Figure 2:
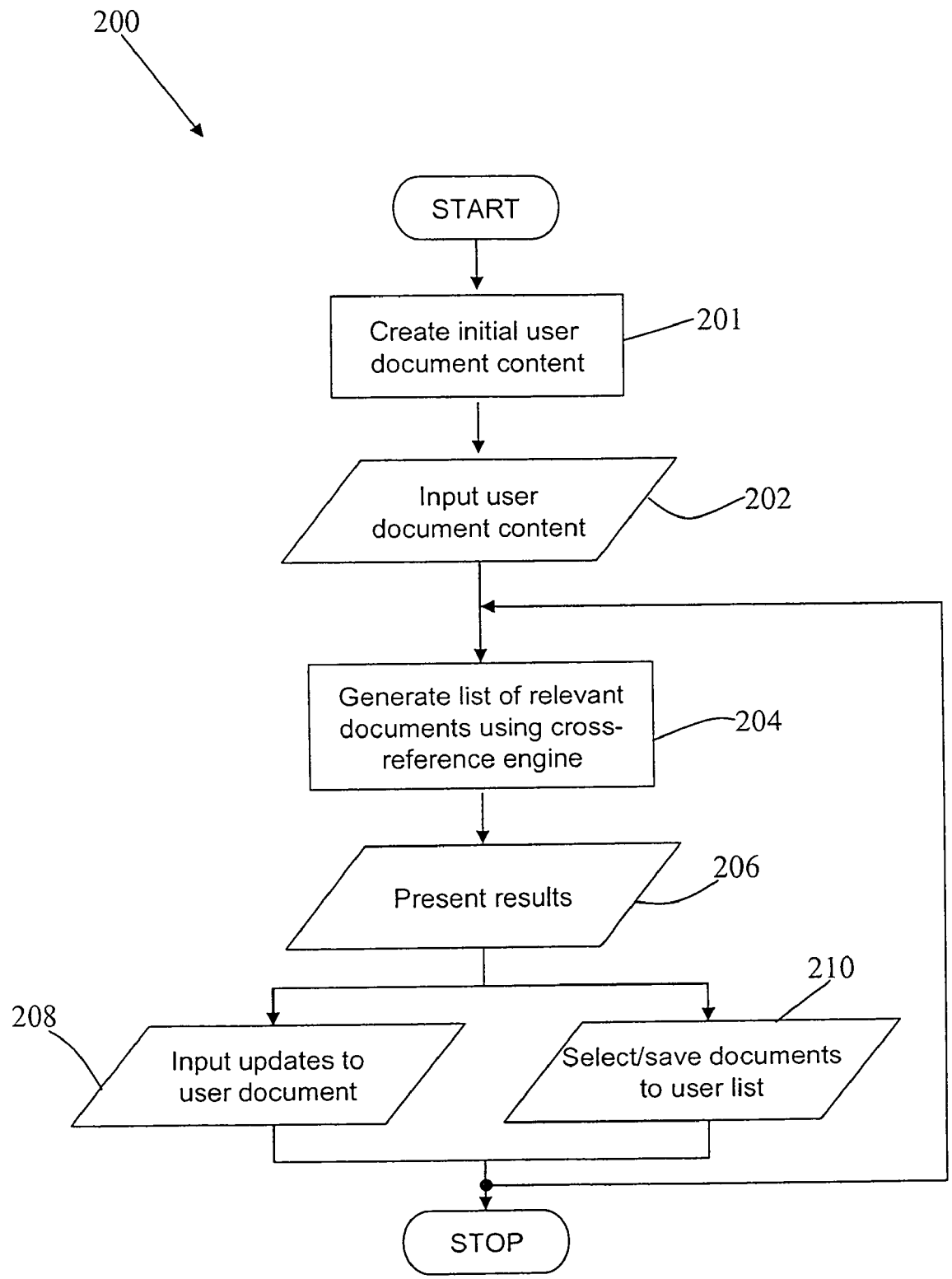
FIG. 2 is a flow chart illustrating a preferred method of locating documents of interest in accordance with the invention.

FIG. 2 is a flow chart 200 which illustrates a preferred method of maintaining a list of documents of interest in accordance with the present invention. In accordance with this general method, at step 201 the initial content of the editable user document is created by the user. For example, the initial content may be a description of a topic area of interest, and the editable user document may be a web-hosted document presented as a text entry field in a web page or other web-based form, some other type of web-hosted document, or even a plain text document, a word-processing document, an email message, or any other type of document that may subsequently be associated with the research tool. Accordingly, at step 202 the editable user document is associated with the corpus of documents, for example by inputting the user document content to the research system server 102. As will be appreciated by those skilled in the art, the requisite association between the editable user document and the corpus of documents may be established via other mechanisms. For example, a system embodying the invention, such as the server 102, may be provided with a reference to the editable user document, such as a URL or other resource identifier, which enables the system to retrieve the user document contents. Alternatively, a system embodying the invention may provide a suitable API or other interface, enabling other software applications to associate or input user document content as the basis for subsequent research.

In order to accommodate the free-form query input effectively provided by the content of the user document, preferred embodiments of the invention employ a cross-reference engine for conducting searches of the associated corpus of documents. In accordance with an exemplary embodiment, the cross-reference engine uses the content of the user document as a "central" document which is cross-referenced with documents within the corpus, in order to identify a cluster of documents around the user document having a high likelihood of relevance to the user's interests. More specifically a ranking value may be computed for each document in the corpus relative to the user document, by accumulating co-occurrence values corresponding with common occurrences of stemmed words within the user document and within each such document. Generally speaking, therefore, documents including a greater number of stemmed words in common with the user document may be more highly ranked, and considered to be of a greater interest than documents including fewer stemmed words in common with the user document. In itself, however, this simple approach is not sufficient to identify documents of genuine interest, because it fails to distinguish between those words within the user document that are of particular significance to the user's interests, and those that are largely irrelevant, including such frequently occurring words as "and", "the", "a" and so forth.

Accordingly, the preferred implementation of the cross-reference engine applies a weighting to each occurrence value in accordance with the frequency of occurrence of the corresponding stemmed word within the corpus. Specifically, every stemmed word within the corpus is assigned a weighting value based upon the probability of occurrence of the stemmed word, wherein the probability of occurrence p is defined as being the number of documents containing at least one occurrence of the stemmed word divided by the total number of documents in the corpus. As will be appreciated, common words such as "the" will have a probability of occurrence substantially equal to one. Conversely, highly uncommon words may have an extremely low probability of occurrence, particularly if the corpus is very large, as it may be when populated with a significant proportion of all documents available via the Internet.

As will be appreciated, words appearing in the user document that have a relatively low probability of occurrence provide more information regarding the user's interests than very commonly occurring words. This is because a rare word is more effective in identifying documents that are likely to be of interest in relation to the content of the user document. By applying an information theoretic approach, a suitable weighting value may be assigned to words appearing within the corpus of documents based upon the probability of occurrence of each stemmed word. In particular, according to the preferred embodiment of the cross-reference engine, the inverse of the probability of occurrence of each stemmed word is used as the basis for defining a corresponding number of bits of information notionally associated with the word. To be precise, the weighting value w of a stemmed word having a probability of occurrence p is calculates according to the following formula:

$$w = \log_2(p^{-1})$$

By accumulating the co-occurrence values computed by the cross-reference engine in this manner, every word in the corpus may be assigned a corresponding ranking value in relation to the user document. Documents having a higher ranking value are thereby considered to be of greater interest to the user than documents having a lower ranking value. Search results may thereby be displayed for examination by the user according to the determined ranking, with more highly-ranked documents being presented prior to less highly-ranked documents. For the purposes of indicating to the user the degree of relevance of each document, it is generally considered convenient to normalise each ranking value such that a fractional ranking between zero and one is presented, or alternatively the normalised ranking value may be presented to the user as a percentage. Furthermore, in order to avoid presenting the user with an unmanageable number of results, the number of documents returned by the search engine may be limited in number and/or by relevance. For example, the total number of documents returned may be restricted to, for example, fifty documents and/or only documents having a ranking value above a specified threshold value, for example 15%, may be returned. As will be appreciated, in any given embodiment these parameters may be selected in any appropriate manner, or may be configurable by the user.

Returning now to the flowchart of FIG. 2, at step 204 a list of documents relevant to the content of the editable user document is generated, including an initial ranking value assigned to each corpus document in the list, using the cross-reference engine as described above. At step 206 an initial list of one or more documents of interest from within the corpus, selected and ranked on the basis of said initial ranking values, is presented to the user.

Once the initial list of documents has been presented, the user may be provided with the opportunity to take one or more actions on the basis of the results. In particular, at step 208 the user is able to input updates to the editable user document. For example, the user document may be employed as a form of "notebook", into which the user may input notes, comments, observations, and other information derived from the content of the documents included in the initial list of documents of interest. Such further input will generally represent improvements in the user's understanding of the topic of interest.

Alternatively or additionally, at step 210 the user is able to make selections of one or more documents from the initial list of documents of interest, whereby said selections are added to a list of user-selected documents. This list may be saved for future reference by the user, and is therefore useful as a means for the user to maintain a record of the documents that have been found to be most relevant and/or interesting in relation to a particular research topic. In preferred embodiments of the invention, the list is presented to the user as part of a relevant user interface, such as that described below with reference to FIG. 5. In this way, the list of user-selected documents is readily available, either permanently or on-demand, for easy reference by the user during their ongoing research. Advantageously, documents appearing on the list of user-selected documents may be excluded from further lists of documents generated from within the corpus and presented to the user, such that the presentation of redundant information is avoided, and the list of results presented to the user may be devoted to only those documents in which the user has not already demonstrated a particular interest.

Other forms of input may also be received from the user (not shown in FIG. 2), and may include, for example, references to documents not identified in the initial list of documents from within the corpus or presented to the user.

Once the user has made any desired updates to the editable user document at step 208, and/or made any selections of the documents presented in the initial list at step 210, the method returns to step 204 to generate a further list of documents within the corpus based upon the updated content of the editable user document. This iteration of the process may be initiated, for example, by the user saving one or more updates made to the editable user document, or may alternatively occur automatically upon the completion of one or more updates to the user document by the user. In general, the generation of further lists of results may be performed at any desired interval including almost continuous operation responsive to user edits, periodic operation, and/or operation responsive only to explicit user actions or requests. As will be appreciated, the generation and presentation of a revised list of documents of interest may be initiated in a variety of different ways, and the foregoing alternatives should not therefore be considered exhaustive.

Figure 3:
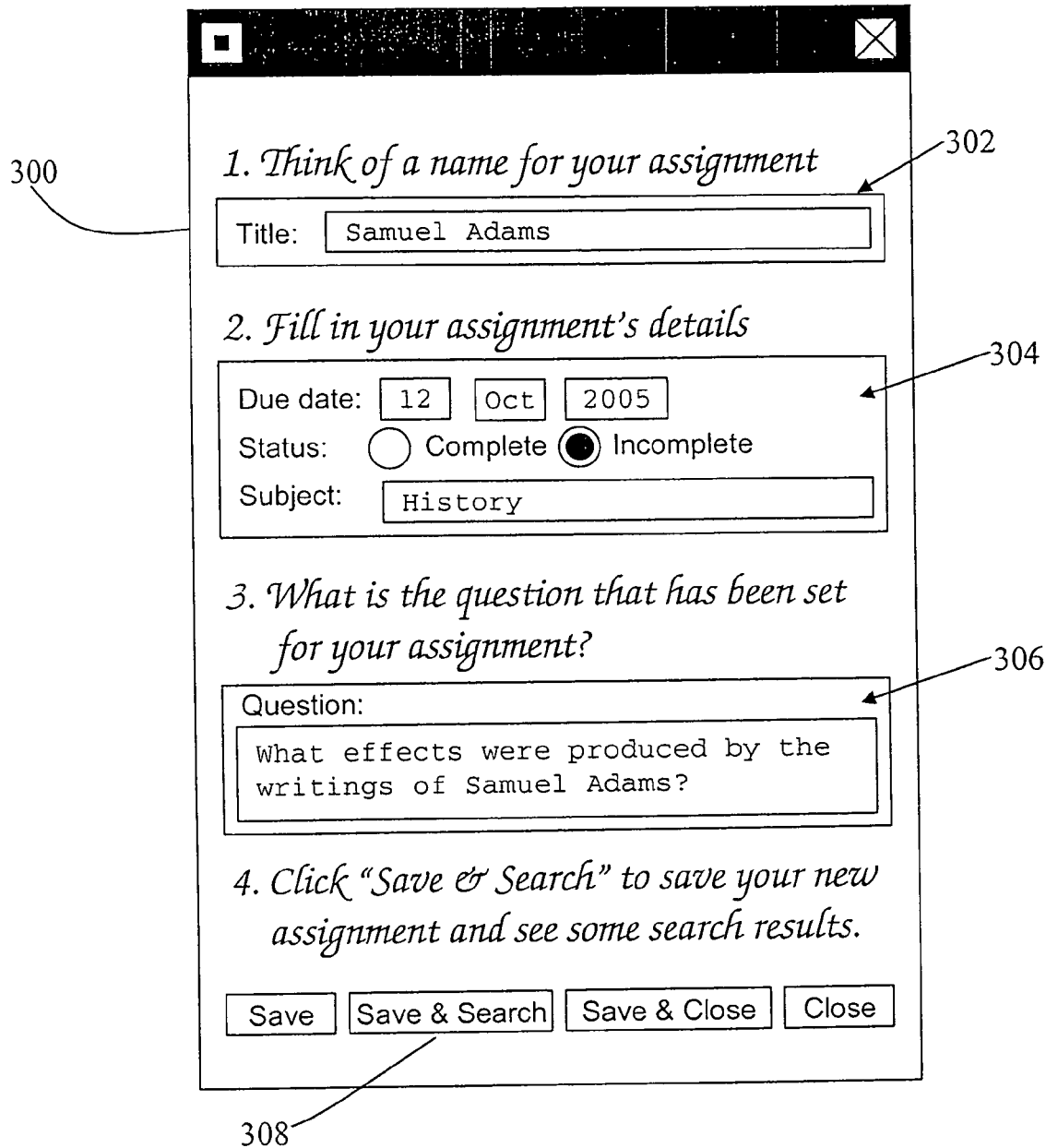
FIG. 3 illustrates an exemplary initial search query form in accordance with an embodiment of the invention.
Figure 4:
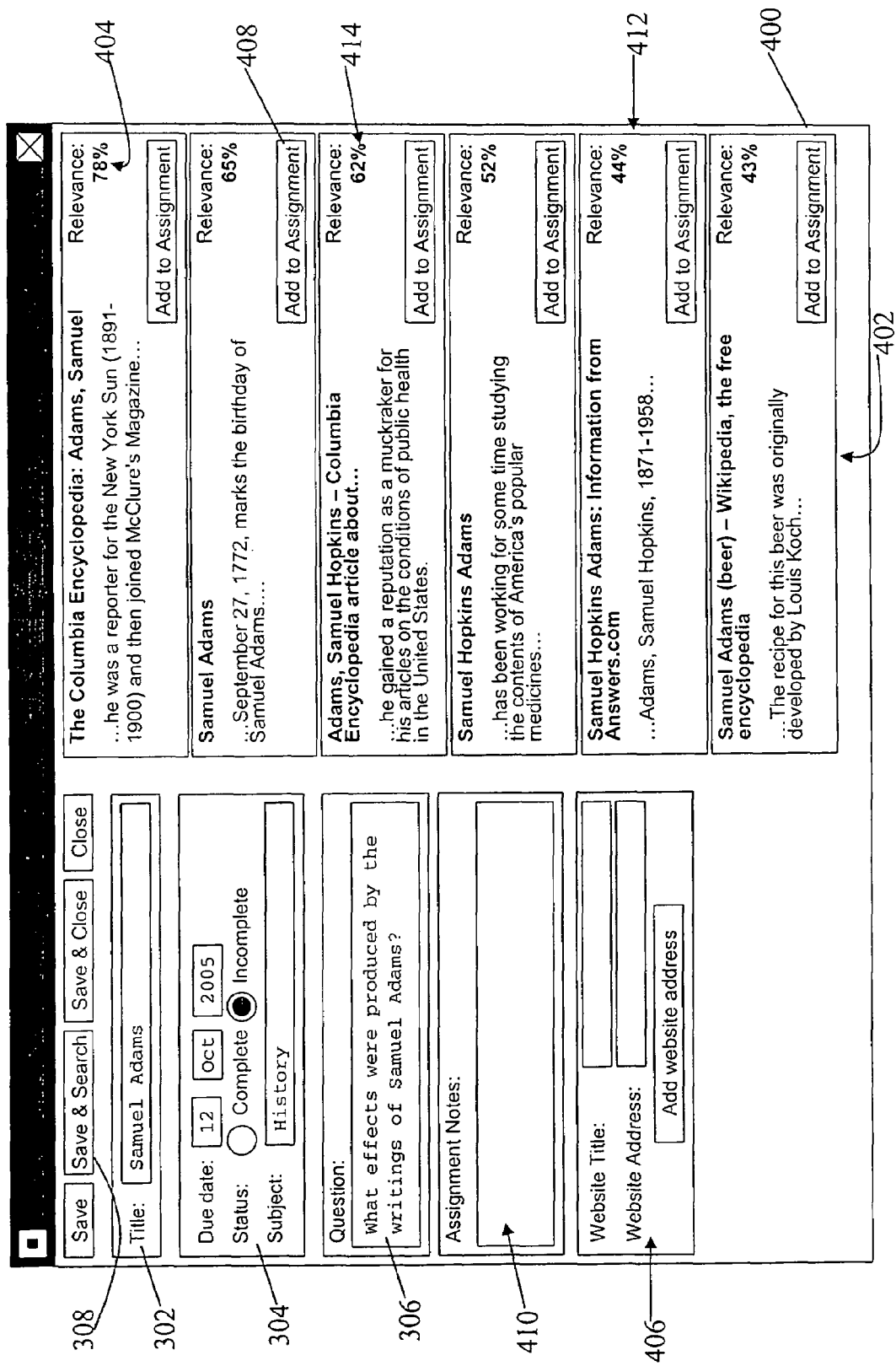
FIG. 4 illustrates an exemplary search results display and search feedback form in accordance with an embodiment of the invention.
Figure 5:
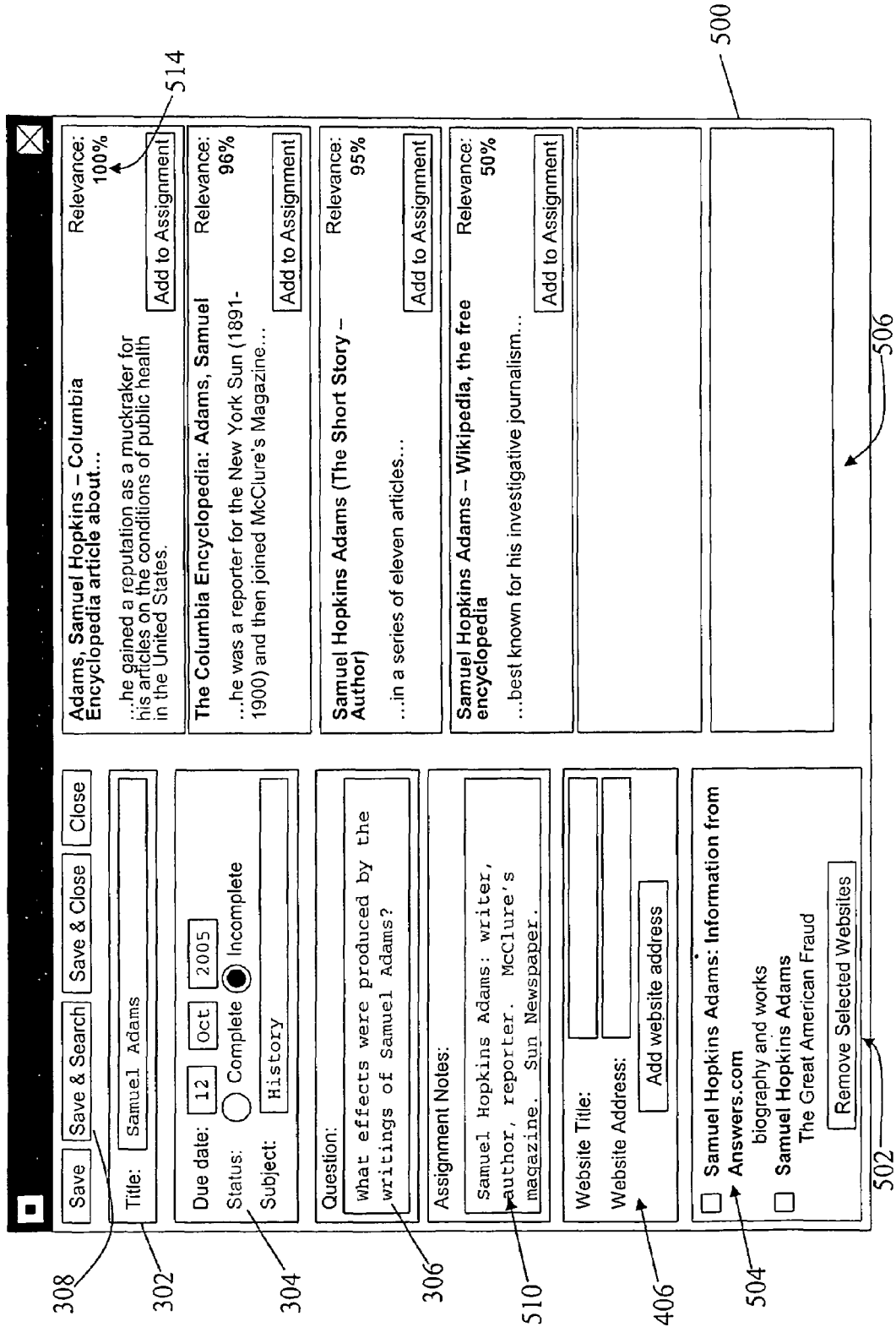
FIG. 5 illustrates an exemplary further search results display and search feedback form in accordance with an embodiment of the invention.

In order to further illustrate the preferred features and corresponding advantages of the present invention, FIGS. 3 to 5 illustrate aspects of a user interface of one particular embodiment of the invention. The embodiment represented by these figures is particularly intended for use by school students for researching school assignment topics on the Internet. The interface to the search engine in this case is a web-based interface, which is accessed by users of the system using a conventional web browser executing on the user's terminal, eg 104.

FIG. 3 illustrates an exemplary initial user document form 300. The form 300 includes a number of controls enabling the user to enter information in relation to the assignment to be researched. A title for the assignment may be provided in the text box 302. General information regarding the assignment, including its due date, the present status of the assignment, and the general subject area of the assignment may be entered via the corresponding interface elements 304. A free-form text entry box 306 is provided, into which the user enters the assignment question. The assignment question forms the initial content of the user document utilised by the search engine. It will be appreciated that, in accordance with preferred embodiments of the invention, there is no need for the user to identify suitable keywords based upon the assignment topic. Clearly, this is particularly beneficial in the case of relatively inexperienced users of search engines who may have difficulty distinguishing for themselves between those words in the search query that are likely to produce relevant results, and those which may result in the identification of largely misleading or irrelevant results. Indeed, even experienced researchers, when faced with a new and unfamiliar topic of research, may be unable to determine easily a list of initial key words which are most likely to provide highly relevant results.

Once all of the other fields of the form 300 have been completed, the user may click on the "save and search" button 308, in order to commence the initial search.

FIG. 4 illustrates an exemplary search results display and search update form 400 in accordance with the exemplary embodiment of the invention. A column of search results 402 appears on the right hand side of the user display. Each search result has associated with it a corresponding relevance value, eg 404, expressed as a percentage. The search update form appearing to the left of the display includes the fields of the initial user document form 302, 304, 306, 308, as well as additional content entry fields 406, 410.

Within the user interface elements 406 of the update form, the user is able to enter the title and address of any document on the web considered to be of interest to the assignment topic. Any document references entered in this manner may be added to a user list of selected documents in the general manner described below with reference to FIG. 5. Additionally, each result in the results column 402 is provided with a button, eg 408, which adds the corresponding document to the user list of selected documents. An "assignment notes" text entry box 410 is provided, into which the user may enter any notes, information or other text of relevance that may arise out of their ongoing research of the assignment topic. The contents of notes entered into the box 410 are incorporated into the content of the user document utilized in generating further lists of documents of interest.

Once the user has completed the entry of feedback in relation to the initial search, they may once again click on the "save and search" button 308, in order to conduct a further search based upon the updated user document contents, including the combined content of the initial user document and the additional content added in update form 400. It will be appreciated that while the particular embodiment described herein utilizes the "save and search" button 308 as a means to trigger the generation of a revised list of documents, other approaches are equally applicable within the general scope of the present invention. For example, a revised list may be generated automatically in response to any update to the user document (ie the "assignment notes" 410), or in response to any substantial update (eg changes of more than a specified minimum number of words). Alternatively, checks for updates and the generation of revised results may be performed at periodic intervals. In general, the invention encompasses a range of methods ranging from continuous revision in response to user updates, through to revision responsive only to explicit user input, such as the "save and search" button 308 of the present embodiment.

FIG. 5 illustrates a corresponding display 500 of further search results. In the update form area on the left of the display, a number of user-selected web documents identified by the user following the initial search are listed in the region 502. For example, the listed web site 504 was entered into the user-selected document list following the initial search by clicking on the corresponding "add to assignment" button 412. The user in this case has also entered some additional notes shown in the assignment notes entry box 510, and these have also been incorporated into the further search.

The resulting further search results 506 differ from the original search results 402, as a result of the additional user document content available to the cross-reference engine during the further search. In particular, it will be noted that an on-line encyclopedia article relating to the central subject of the assignment topic is now the most highly-ranked document, having a relevance score of 100% (514). Based only upon the initial content (ie the assignment question), this same document was ranked third and considered to have a relevance of only 62% (414). This example serves to illustrate the great power of the present invention for locating documents of particular interest to a user, via a highly intuitive and free-form interface.

Furthermore, according to the exemplary embodiment of the invention illustrated in FIGS. 3 to 5, the web based system provides a complete online research solution which enables the user to identify and save references to documents of particular interest, and to enter notes on the topic as they progress with their research, all as part of one integrated process. Accordingly, problems of prior art systems, which failed to encourage the user to utilise their improving knowledge in the course of research in order to obtain increasingly relevant search results, are substantially mitigated by the invention at least in its most preferred embodiments.

While one preferred embodiment of the invention has been described in the foregoing, being an implementation of a web-based research tool, it should be understood that the invention may be embodied in a variety of alternative forms. For example, while there are certain advantages to centralising the typically large database containing the corpus of documents, and the associated cross-reference engine, either one or both of these components of the system may be incorporated within a user computer, making them available for offline use, rather than deploying them via a network such as the Internet.

For example, the specific embodiment described herein includes a user interface in which the initial content of the user document includes a title and an assignment question, while updates to the content are principally provided in the form of assignment notes. It will be understood, however, that this is an exemplary interface only, and that the user input may be provided in a variety of different forms within the scope of the invention. For example, the user document may take the form of a single unstructured document (as would typically be the case with a text file or a word processing document), wherein the initial content is entirely at the discretion of the user. In various examples, the initial content may be a title, a problem statement, an introductory paragraph, overview or topic summary. Updates may consist of additions, deletions, amendments, or continuations of the initial document. Accordingly, the form of the user document, in terms either of its internal structure or the way in which it is presented to the user, is not subject to specific limitations.

In other variations, alternative ranking methods may be employed. For example, one advantageous approach involves associating a thesaurus with the cross-reference engine, such that it is possible to accumulate co-occurrence values not only between matching stemmed words, but also between synonyms thereof. Such an approach would enable the improved identification and ranking of documents that may relate to subject matter of interest to the user, but which do not use identical terms to those selected by the user. Similarly, by associating one or more multi-lingual dictionaries with the cross-reference engine it would be possible, at least in principle, to identify and rank relevant documents in different languages. In any case, it will of course be appreciated that the invention is not limited to any particular language, whether or not a multi-lingual cross-reference engine is implemented.

In other alternative embodiments, the interface by which a user may provide content need not be wholly, or even partially, web-based. For example, any document created and updated by a user may in principle form the basis for generating and presenting initial and revised lists of documents of interest to the user. For example, a plain text document or a word-processing document created and edited by the user on a local computer may include content relevant to a particular topic of interest. An appropriately configured software program may be provided to identify updates to the user document, retrieve the corresponding content, and provide said content to either a local or remote system for generation of documents relevant to the content, which may subsequently or simultaneously be presented to the user. In such embodiments, the invention may be deployed to provide a form of automated "research assistant", which is able to continuously present updated lists of documents relevant to the content of an editable user document being prepared by the user.

In still further applications of the invention, the editable user document may be, for example, an email message that is being composed by the user. Continuously or periodically updating lists of documents relevant to the content of the email message may be generated and presented to the user, who may use this information to improve, correct, or extend the content of the email message.

Similarly, embodiments of the invention may be deployed in more interactive types of messaging and communications applications, such as instant messaging or chat systems, on-line collaborative working environments, and fixed (wired) or mobile/cellular (wireless) telecommunications systems. In any such applications, the provision of an updating list of documents relevant to the content of a message or other document which a user is composing, either individually or in collaboration with one or more other users, may be of assistance in improving the relevancy, accuracy, completeness or other desirable qualities of the user document. In collaborative environments in particular, the contents of a single document to which multiple users contribute, and/or the combined content of multiple user documents, may be used as the basis for identifying, ranking and presenting one or more lists of documents selected from a relevant corpus.

As will be appreciated, therefore, the invention has the potential to provide powerful tools enabling the functionality of conventional search engines to be improved upon, and integrated with other widely deployed software applications, such as document editors, messaging systems, and the like, such that vast online information resources may be seamlessly incorporated into a wide range of everyday tasks.

It will therefore be understood that while preferred embodiments of the invention have been described herein, these should to be considered to limit the scope of the invention, which is defined by the claims appended hereto.

I claim:

1. A computer-implemented method of maintaining a list of documents of interest to a user within a corpus of documents stored in a database, the method comprising the steps of:
    creating and storing an association of an editable user document with said corpus of documents;
    generating an initial list of documents within the corpus based upon an initial content of the editable user document by using a cross-referencing engine to cross-reference said initial content with content of documents in the corpus, each entry in said initial list being assigned a corresponding initial ranking value computed by the cross-referencing engine based upon said cross-referencing;
    presenting the user with a display of an initial list of one or more documents of interest from within the corpus on the basis of said initial ranking values;
    responsive to one or more updates of the editable document entered by the user, generating one or more further lists of documents within the corpus based upon updated content of the editable user document by using the cross-referencing engine to cross-reference said updated content with content of documents in the corpus, each entry in said further list being assigned a corresponding revised ranking value based upon said cross-referencing; and
    presenting the user with a display of a revised list of one or more documents of interest from within the corpus on the basis of said revised ranking values.

2. The method of claim 1 wherein the editable user document is of a type selected from the list comprising: plain text documents; word processing documents; email messages; instant messaging or other interactive chat messages; collaborative documents; Short Message Service (SMS) messages; and web-hosted documents.

3. The method of claim 1 wherein the steps of presenting the user with a display of an initial list and with a display of a revised list of one or more documents of interest include selecting one or more documents having ranking values indicative of a higher degree of relevance to the content of the editable user document than other documents in the corpus and presenting the user with a display including a list of said selected documents.

4. The method of claim 1 wherein assigning an initial ranking value or a revised ranking value of a document in the corpus comprises the cross-referencing engine accumulating computed co-occurrence values corresponding with common occurrences of stemmed words appearing within the editable user document and within said document in the corpus.

5. The method of claim 4 which comprises the cross-referencing engine applying a weighting to each said co-occurrence value in accordance with a frequency of occurrence of the corresponding stemmed word within the corpus.

6. The method of claim 5 wherein the weighting of each co-occurrence value is computed by the cross-referencing engine based upon a probability of occurrence of the corresponding stemmed word within the corpus.

7. The method of claim 6 wherein the weighting value (w) is computed by the cross-referencing engine from the probability of occurrence (p) according to the formula: $w = \log_2 (p^{-1})$.

8. The method of claim 4 wherein the cross-referencing engine accumulating co-occurrence values comprises accumulating values corresponding with occurrences of synonyms of stemmed words appearing within the editable user document and within said document in the corpus.

9. The method of claim 1 which further comprises the step of transmitting the content and/or updates of the editable user document from a user computer to a server computer via a data network, and wherein the steps of generating initial and further lists of documents within the corpus are performed by said server computer, and the steps of presenting the user with the initial and revised lists of documents of interest are performed by said user computer.

10. The method of claim 1 wherein the step of generating one or more further lists of documents within the corpus is initiated by the user saving the editable user document following entry by the user of one or more updates.

11. The method of claim 1 wherein the step of generating one or more further lists of documents within the corpus is automatically initiated following any update entered by the user of the editable user document.

12. The method of claim 1 comprising the further steps of:
    receiving from the user one or more selections of documents from the initial and/or revised lists of documents presented to the user; and
    adding said selections to a list of user-selected documents.

13. The method of claim 12 wherein documents included in the list of user-selected documents are excluded from subsequent further lists of documents generated from within the corpus.

14. A computer-implemented system for maintaining a list of documents of interest to a user within a corpus of documents, the system including one or more computers comprising:
    at least one processor;
    a database of the corpus of documents; and
    at least one storage medium operatively coupled to the processor, the storage medium containing program instructions for execution by the processor, said program instructions causing the processor to execute the steps of:
    associating an editable user document with said corpus of documents;
    generating an initial list of documents within the corpus based upon an initial content of the editable user document by cross-referencing said initial content with content of documents in the corpus, each entry in said initial list being assigned a corresponding initial ranking value based upon said cross-referencing;
    presenting the user with an initial list of one or more documents of interest from within the corpus on the basis of said initial ranking values;
    responsive to one or more updates of the editable document by the user, generating one or more further lists of documents within the corpus based upon updated content of the editable user document by cross-referencing said updated content with content of documents in the corpus, each entry in said further list being assigned a corresponding revised ranking value based upon said cross-referencing; and presenting the user with a revised list of one or more documents of interest from within the corpus on the basis of said revised ranking values.

15. The system of claim 14 wherein said one or more computers includes at least one server computer which comprises an interface between a processor thereof and a data network, and wherein the database of the corpus of documents is accessible by said server computer, and wherein the at least one storage medium further contains program instructions for execution by the processor, said program instructions causing the processor to execute the steps of:

receiving content and/or updates of the editable user document from a user computer system via the data network; and transmitting the initial list of documents and further list of documents to the user computer system via the data network for presentation to the user by the user computer system.

16. The system of claim 14 wherein said program instructions cause the processor, in the steps of presenting the user with an initial list and a revised list of documents within the corpus, to select and present one or more documents having ranking values indicative of a higher degree of relevance to the content of the editable user document than other documents in the corpus.

17. The system of claim 14 wherein said program instructions cause the processor, in the steps of generating an initial list of documents and generating one or more further lists of documents, to compute a ranking value for each listed document by accumulating co-occurrence values corresponding with common occurrences of stemmed words within the content of the user document and within each said document of the corpus.

18. The system of claim 17 wherein said program instructions cause the processor to weight each said co-occurrence value in accordance with a frequency of occurrence of the corresponding stemmed word within the corpus.

19. The system of claim 18 wherein said program instructions cause the processor to weight each co-occurrence value based upon a probability of occurrence of the corresponding stemmed word within the corpus.

20. The system of claim 19 wherein said program instructions cause the processor to compute the weighting value (w) from the probability of occurrence (p) according to the formula: $w=\log_2(p^{-1})$.

21. The system of claim 17 wherein accumulating co-occurrence values comprises accumulating values corresponding with occurrences of synonyms of stemmed words appearing within the editable user document and within said document in the corpus.

22. The system of claim 14 wherein said storage medium further contains program instructions for execution by the processor, said program instructions causing the processor to execute the steps of:

receiving from the user one or more selections of documents from the initial and/or revised lists of documents presented to the user; and adding said selections to a list of user-selected documents.

23. The system of claim 22 wherein said program instructions cause the processor to exclude documents on the list of user-selected documents from subsequent further lists of documents generated from within the corpus and/or from subsequent revised lists of documents presented to the user.

24. A computer-implemented system for maintaining a list of documents of interest to a user within a corpus of documents, the system including:

means for associating an editable user document with said corpus of documents;

means for generating an initial list of documents within the corpus based upon an initial content of the editable user document by cross-referencing said initial content with content of documents in the corpus, each entry in said initial list being assigned a corresponding initial ranking value based upon said cross-referencing;

means for presenting the user with an initial list of one or more documents of interest from within the corpus on the basis of said initial ranking values;

means, responsive to one or more updates of the editable user document, for generating one or more further lists of documents within the corpus based upon updated content of the editable user document by cross-referencing said updated content with content of documents in the corpus, each entry in said further list being assigned a corresponding revised ranking value based upon said cross-referencing; and means for presenting the user with a revised list of one or more documents of interest from within the corpus on the basis of said revised ranking values.

25. A tangible computer-readable medium having computer-executable instructions stored thereon for performing a method of maintaining a list of documents of interest to a user within a corpus of documents, the method comprising the steps of:

associating an editable user document with said corpus of documents;

generating an initial list of documents within the corpus based upon an initial content of the editable user document by cross-referencing said initial content with content of documents in the corpus, each entry in said initial list being assigned a corresponding initial ranking value based upon said cross-referencing;

presenting the user with an initial list of one or more documents of interest from within the corpus on the basis of said initial ranking values;

responsive to one or more updates of the editable document by the user, generating one or more further lists of documents within the corpus based upon updated content of the editable user document by cross-referencing said updated content with content of documents in the corpus, each entry in said further list being assigned a corresponding revised ranking value based upon said cross-referencing; and presenting the user with a revised list of one or more documents of interest from within the corpus on the basis of said revised ranking values.

\* \* \* \* \*